Nov. 24, 1931.  L. VON REIS  1,833,239
METHOD OF HANDLING SHEET GLASS
Filed March 28, 1930
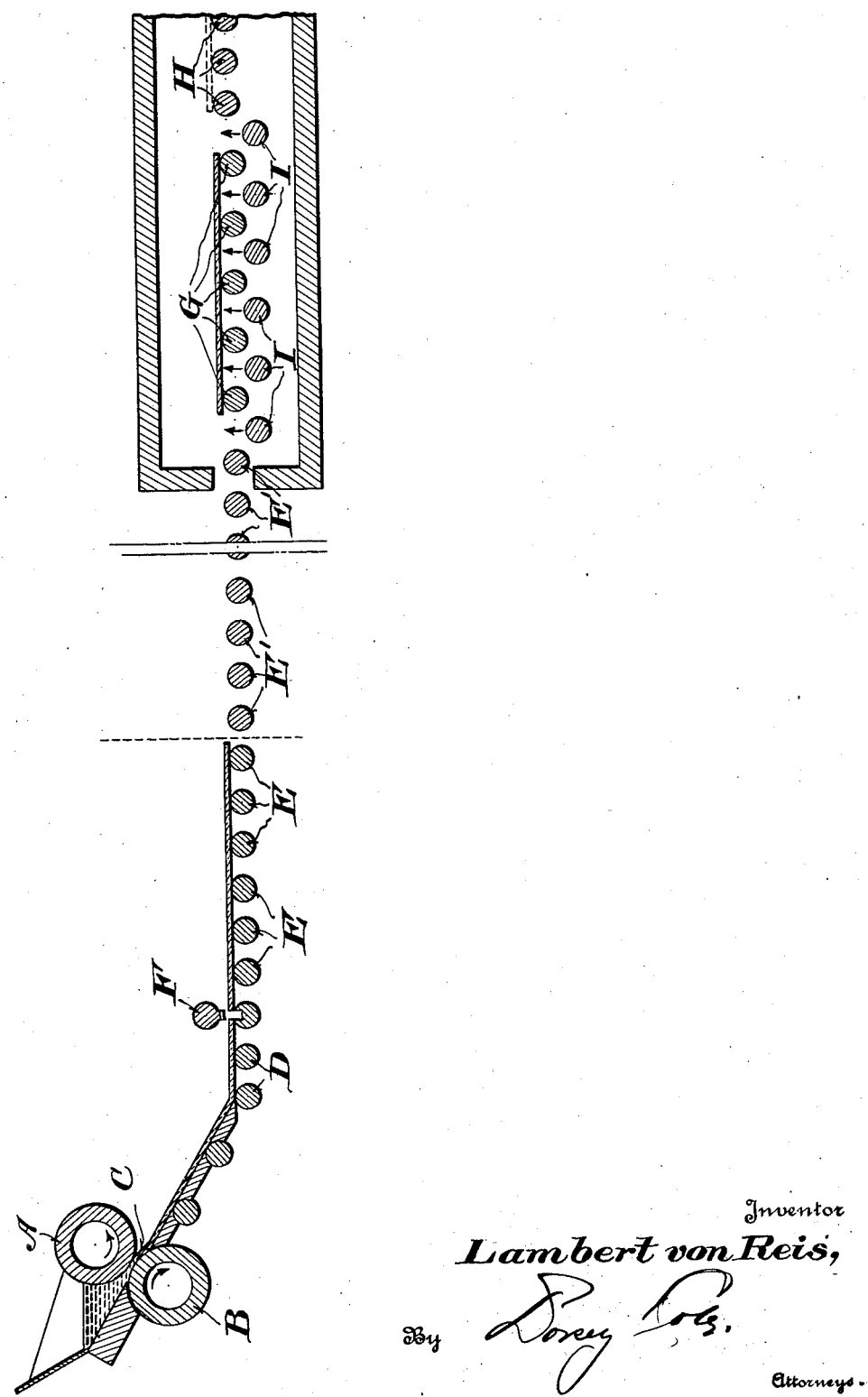
Inventor
Lambert von Reis,
By
Attorneys.

Patented Nov. 24, 1931

1,833,239

UNITED STATES PATENT OFFICE

LAMBERT VON REIS, OF HERZOGENRATH, GERMANY, ASSIGNOR, BY MESNE ASSIGNMENTS TO THE AMERICAN BICHEROUX COMPANY, A CORPORATION OF DELAWARE

METHOD OF HANDLING SHEET GLASS

Application filed March 28, 1930. Serial No. 439,776.

This invention relates to the process of delivering sheet glass from a forming machine to a lehr, and has for its object to provide for a rapid introduction of a sheet into the lehr at a proper time, and a subsequent reduction in speed of the sheet in the lehr to prevent the necessity of the latter being of excessive length and to permit proper stowage of the sheets. It comprises the steps of receiving glass from the forming machine on a roller bed, severing a sheet from the formed glass when on the bed, accelerating the movement of the severed sheet whereby after a proper interval it is rapidly introduced into a lehr and in then slowing the speed of the sheet in the lehr.

Referring to the accompanying drawing which represents diagrammatically a structure by which the improved process may be carried out, A and B are forming rolls preferably of a Bicheroux forming machine, the glass being formed at the pass C between the rolls. Located in front of the forming machine and below the same is a roller conveyor, consisting of rollers D, E and E', between the series of rollers D and E being interposed a sheet cutting mechanism F. The rollers D are driven at a constant speed, i. e. a speed substantially equal to that of sheet formation, while the several rollers E immediately in advance of the cutting mechanism may be driven either at the same speed as the rollers D or at a higher speed. The rollers E' are driven at the high speed of the rollers E, and rollers D, E and E' are, by preference spaced close together so as to support the sheet traveling thereon. Immediately in advance of the rollers E' and within the lehr are the rollers G which are more spaced apart than the preceding rollers. Further in the lehr are the lehr conveying rollers H driven at proper lehring speed. In the section of the roller bed in which are located the spaced rollers G are also located rising and falling rollers I driven at lehring speed and capable of moving up between the rollers H. Rollers of this type are known and are shown in the patent to Gentil and Mathé, No. 1,728,538.

In carrying out my improved process glass is fed to the forming machine in quantities sufficient to make a long ribbon, say, 90 feet in length, and feeds through the forming pass and onto the roller bed. When a predetermined length of this ribbon corresponding to the desired length of the several sheets to be formed has fed past the cutter F, the latter acts to sever the first sheet from the portions behind the cutter, this first sheet at this time resting on the rollers E which are being driven with the same peripheral speed as the speed of sheet formation, say, 2 feet per second. Rollers E are now accelerated in speed to say, 4 feet per second and the severed sheet is advanced over the rollers E and E' towards the lehr, which may be at a distance of, say, 60 feet from the cutting mechanism. During the fifteen seconds required for the sheet to travel this distance the sheet more or less hardens and is sufficiently hard when delivered to the rollers G, which are moving at the same speed as the rollers E' as not to unduly sag, although such rollers are spaced apart. As soon as the glass sheet throughout its entire length rests on the rollers G, the rollers I are raised into feeding portion. As the rollers I are driven at lehring speed the advance of the sheet to the rollers H takes place at lehring speed. The rollers H may be on the same level as the rollers G or may be on a level slightly higher. When the rollers G are disposed in the same horizontal plane as the rollers H, they are disconnected from their drive so that they run idle as soon as the rollers I are brought into operative position, by being raised into the plane of the rollers G. When, however, the rollers G are disposed at a level lower than the rollers H, and the sheet throughout its entire length rests on the rollers G and in the desired proximity of the preceding sheet, the rollers I are raised into the plane of the rollers H lifting the sheet accordingly and delivering it with lehring speed to the rollers H. After the sheet has moved from over the rollers I, same are lowered again into their initial position below the plane of the rollers G. The rollers I are either lowered individually one after the other or they are lowered simultaneously upon the tail of the sheet having moved from over the foremost of them.

To permit the proper delivery to the rollers E of the forward end of the succeeding section of the ribbon while the severed section before discussed is being accelerated on the rollers E, the initial rollers E in advance of the cutting mechanism F, may be reduced from delivering speed to the speed of sheet formation as soon as the tail of the first sheet has passed from thereover. The described variations in the speed of the roller E may be accomplished manually, or the putting of the variable speed rollers into high speed condition may also be accomplished by controlling an electric circuit by the cutting action and the putting of the several rollers into low speed condition may be effected by triggers actuated by the passage of the tail of a sheet from off the individual rollers. Circuits and contacts suitable for this purpose are shown in the Gentil and Mathé patent.

The operations above specified are repeated until the entire ribbon has been formed and severed into lengths and delivered to the lehr.

If desired means may be provided whereby the rollers E' and G may be driven at a speed best suited to deliver the sheet glass to the lehr at the proper temperature for the commencement of the annealing operation. This is possible as the high speed of the rollers E and the speed of the rollers E' and G have no necessary fixed relation to the speed of the rollers D and H.

Having thus described my invention what I claim as new and desire to secure by U. S. Letters Patent is:—

The hereinbefore described method of handling glass sheets which comprises forming glass into a ribbon, delivering such ribbon on a roller bed, severing the ribbon as received on the roller bed into sheets of desired lengths, accelerating the speed of the rollers on which the severed sheet is resting at the time of severing, feeding the severed sheet off the said rollers at accelerated speed, and successively reducing the speed of such rollers as the tail of the severed sheet moves from thereover.

In testimony whereof I have signed my name to this specification.

LAMBERT von REIS.